United States Patent [19]

Nacewicz et al.

[11] Patent Number: 5,617,001
[45] Date of Patent: Apr. 1, 1997

[54] A.C. MOTOR STARTING CONTROL CIRCUIT UTILIZING TRIGGERABLE SEMICONDUCTOR SWITCHING DEVICE

[75] Inventors: Stanley J. Nacewicz, Plainville; Stephen P. Geishecker, East Walpole, both of Mass.

[73] Assignee: Texas Instruments Incorporated, Dallas, Tex.

[21] Appl. No.: 387,998

[22] Filed: Feb. 13, 1995

[51] Int. Cl.$^6$ .................................. H02D 1/00
[52] U.S. Cl. ........................................... 318/788
[58] Field of Search .................. 318/778, 783, 318/785, 786, 788, 791, 792, 794

[56] References Cited

U.S. PATENT DOCUMENTS

| | | | |
|---|---|---|---|
| 3,544,869 | 12/1970 | Plouffe et al. | |
| 3,600,656 | 8/1971 | Gramkow | 318/788 |
| 3,643,142 | 2/1972 | McBride, Jr. | |
| 3,683,250 | 8/1972 | Fricker | 318/788 |
| 3,696,281 | 10/1972 | Gramkow et al. | 318/788 |
| 3,761,792 | 9/1973 | Whitney et al. | 318/788 |
| 3,764,871 | 10/1973 | Scheuer et al. | 318/788 |
| 3,832,612 | 8/1974 | Woods | 318/788 |
| 4,047,082 | 9/1977 | Scheuer et al. | 318/788 |
| 5,391,971 | 2/1995 | Yamada et al. | 318/778 |

*Primary Examiner*—Jonathan Wysocki
*Attorney, Agent, or Firm*—Russell E. Baumann; Richard L. Donaldson; René E. Grossman

[57] ABSTRACT

A starting circuit for use with single phase induction motors such as capacitor run and capacitor start, capacitor run motors is shown having a triggerable semiconductor (Q1, Q2 and Q3) serially connected to the auxiliary winding (AW) across the power supply (L1, L2). A resistor (RA) is serially connected at (J1) to the main winding (MW) to form a voltage divider to aid in providing triggering current to the triggerable semiconductor. A thermistor (PTC) is connected between the gate and the voltage divider junction (J1). The triggerable semiconductor is shown as a triac (Q1) in certain embodiments and as back to back SCRs (Q2 and Q3) in other embodiments. In high current motors the voltage divider resistor (RA) is shown thermally coupled to the thermistor (PTC).

8 Claims, 2 Drawing Sheets

5,617,001

A.C. MOTOR STARTING CONTROL CIRCUIT UTILIZING TRIGGERABLE SEMICONDUCTOR SWITCHING DEVICE

BACKGROUND OF THE INVENTION

This invention relates generally to A.C. motors and more particularly to starting control circuits for single phase induction motors.

A.C. single phase induction motors require a starting method to rotate the magnetic field of the windings to generate sufficient torque to start rotation of the rotor. Such motors have an auxiliary or start winding in addition to a main winding. During start-up of the motor both the main and auxiliary windings are energized to bring the motor up to speed. Once operating speed is reached the torque supplied by the auxiliary winding is no longer needed and for optimum operational efficiency of the motor it is necessary to effectively disconnect the auxiliary winding.

It is known to place a triggerable solid state switch such as a thyristor in series with the auxiliary winding across an A.C. power source. Conduction between the main terminals of the switch is initiated by applying a triggering current to the gate terminal and is terminated when the triggering current is reduced below a predetermined level. Examples of such controls are shown and described in U.S. Pat. Nos. 3,544,869 and 3,643,142 assigned to the assignee of the present invention. In the former patent, a thermistor is interconnected with the gate terminal of the device for controlling the flow of triggering current thereto. The thermistor reduces the triggering current below the predetermined triggering level when it is heated to a predetermined threshold temperature. A heater thermally coupled to the thermistor is connectable across the auxiliary winding so that it is energized to heat the thermistor concurrently with the energization of the auxiliary winding. The solid state switch is triggered to supply current to the auxiliary winding upon energization of the motor and the heater thereby heats the thermistor. After a predetermined delay to reach the threshold temperature, the thermistor reduces the triggering current below the predetermined triggering level of the switch and thereby reduces the current in the auxiliary winding. After this occurs, the heater remains energized by the back E.M.F. voltage induced in the auxiliary winding when the motor is operating thereby maintaining the thermistor above its threshold temperature.

In the U.S. Pat. No. 3,643,142 patent, a PTC thermistor is connected to the gate terminal of a solid state switch for controlling the triggering signals applied thereto. The PTC thermistor is connected to the power supply and is selected so that it self-heats and undergoes a transition into a high-resistance mode of operation without the necessity for externally applied heat and remains in a relatively stable temperature condition upon the establishment of its high-resistance mode of operation.

Although the above noted apparatus can be effective on starting an induction motor and thereafter disconnecting the auxiliary winding, once the auxiliary winding is deenergized it remains de-energized until power to the motor is removed. When power is removed, the PTC thermistor cools to its low-resistance state thereby enabling restarting of the motor.

There are instances where it would be desirable to effectively monitor the main winding current and to reenergize the auxiliary winding to help the motor overcome an overload condition should one occur, however, that is not possible with the above noted motor starting circuits.

SUMMARY OF THE INVENTION

It is an object of the present invention to provide a starting circuit for single phase induction motors which not only energize the auxiliary winding to enable starting of the motor and deenergize the auxiliary winding as the motor gets up to its rated speed but also reenergizes the auxiliary winding when the motor is subjected to overload conditions. Another object of the invention is the provision of such a starting circuit which is easily calibrated and relatively insensitive to variations in supply voltage and which has long life and is relatively simple and inexpensive. Yet another object is the provision of a starting system which can be used to start a relatively wide range of single phase induction motors. Other objects and features will be in part apparent and in part pointed out hereinafter.

Briefly, the invention relates to a starting circuit or system for an electric motor having main and auxiliary windings for reducing current in the auxiliary winding following energization of the motor. The starting circuit comprises a triggerable semiconductor current switching device which is connectable in series with the auxiliary winding across an A.C. power source. Conduction between the main terminals of the device is initiated by applying a triggering current to the gate terminal and is terminated when the triggering current is reduced below a predetermined triggering level. A resistor is connected in series with the main winding forming a voltage divider with the main winding and is chosen having a resistance such that a voltage is developed which can used in gating the triac. A thermistor having a positive temperature coefficient (PTC) of resistivity is connected between the gate terminal of the device for controlling the flow of triggering current and the junction between the serially connected main winding and the resistor to ensure that the current to the gate terminal decreases to below the triggering level. When the triac is turned off, the PTC thermistor quickly cools to its low resistance state to reset the triggering circuit so that in the event that the main winding current increases to a selected level as a result of an overload the triac will be turned on to reenergize the auxiliary winding. In modified embodiment particularly useful with higher amperage motors, the resistor connected to the main winding is thermally coupled to the PTC thermistor to aid in heating the PTC thermistor into its high resistance state. In either embodiment, non-precision resistors, including heater wire, can effectively be used as the voltage divider resistor.

The invention accordingly comprises the constructions hereinafter described, the scope of the invention being indicated in the appended claims.

BRIEF DESCRIPTION OF THE DRAWINGS

In the accompanying drawings in which several of the various possible embodiments of the invention are illustrated.

Corresponding reference characters indicate corresponding parts throughout the several views of the drawings.

Referring now to FIG. 1, there is illustrated a system comprising a control circuit of the invention which is operative to reduce current supplied to an auxiliary winding of a motor after a predetermined delay following energization of the motor. The main terminals of a triac Q1 are connected in series with the auxiliary winding AW of an electric motor across a pair of leads L1 and L2 which provide for connection of the control circuit to a conventional AC power supply. As is known to those skilled in the art, triac Q1 is a member of the family of gate-triggerable semiconductor current switching devices.

Figure 1:
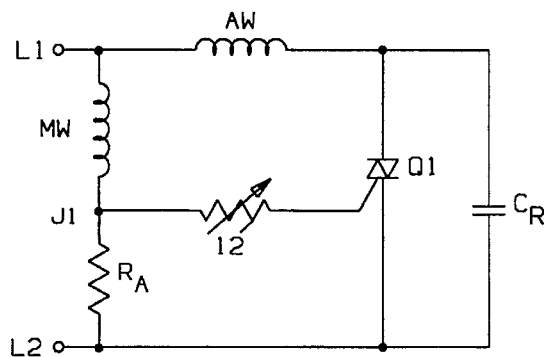
FIG. 1 is a schematic diagram of the starting circuit employing a triggerable semiconductor made in accordance with the invention used with a capacitor run induction motors.

Auxiliary winding AW, with which triac Q1 is connected, may be, for example, the start winding of a conventional single phase motor such as a capacitor-run motor. Conduction between the main terminals of triac Q1 is initiated by applying a triggering current to the gate terminal of the device and is terminated when the triggering current is reduced below a predetermined triggering level. The gate of triac Q1 is serially connected to a PTC thermistor 12 having a low resistance at temperatures below an anomaly point, and having a steeply sloped positive temperature coefficient of resistivity above the anomaly point. In turn, thermistor 12 is connected to the junction J1 of the main winding MW and a resistor RA. Main winding MW and resistor RA are connected across leads L1 and L2 with the resistance of RA selected so that the voltage at the junction can be used to aid in the gating of triac Q1. The values of resistor RA and thermistor 12 are selected to ensure that the voltage drop under normal full load conditions is approximately 0.2 V peak so that the gate current will go below 50 ma to insure turn off. Since the starting currents of such motors are quite high, the peak voltage drop and current draw will exceed 1 volt and 50 ma during starting conditions thereby triggering triac Q1 allowing current to flow in the auxiliary winding. When full speed is achieved the current through the main winding MW decreases and the gate current falls below 50 ma to turn off triac Q1 and deenergize the auxiliary winding. Thermistor 12 switches to its high resistance state due to self-heating caused by the triggering current thereby ensuring that triac Q1 is turned off with the motor running at maximum efficiency. Use of thermistor 12 also makes the selection of the values of resistances for resistor RA less critical since the large increase in resistance of the thermistor will ensure that the triac is turned off. Capacitor CR serves both as a run capacitor and as a snubber to suppress dv/dt transients.

As soon as the triac is turned off, thermistor 12 will cool off returning to its low resistance state within several seconds. Thus, if an overload condition should occur, the thermistor will be reset to conduct sufficient triggering current to the gate of triac Q1 turning it on to increase the torque.

By way of example, a fractional horsepower, single phase motor with a 120 VAC power supply was used with a system made in accordance with the invention having a resistor RA of approximately 0.031 ohms and a PTC thermistor 12 having a base resistance of approximately 7 ohms. Starting conditions resulted in an appropriate voltage level at junction J1 so that, with thermistor 12, suitable triggering current was provided at the gate of triac Q1 to turn on the triac and energize the start winding. Triggering current then caused the PTC thermistor 12 to go into its high resistance state effectively turning off the triac and deenergizing the winding.

Again, by way of example, with motors greater than one horsepower, systems were made which employed a resistance level of approximately 0.12 ohms for resistor RA and a base resistance of approximately 21 ohms for thermistor 12 with similar results providing suitable voltage levels for the gating of triac Q1.

Advantageously, resistor RA can comprise any suitable resistor, including non-precise resistors such as heater wire, approximately having the appropriate level of resistance to gate the triac on since the PTC thermistor will ensure that the triac will be turned off. Thus, the resistance level of resistor RA and the base resistance of thermistor 12 is chosen from a low level to ensure a minimum gating current up to a high level where the triac gate will not be damaged.

Figure 2:
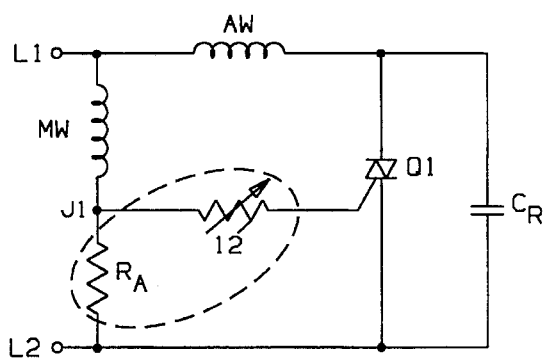
FIG. 2 is a schematic diagram of a modified embodiment of the FIG. 1 invention in which selected elements are thermally coupled together.

With large motors having higher run current levels, for example 15–20 amps, the resistance of RA is decreased and the base resistance of thermistor 12 is increased to provide proper gating current which tends to slow the response time for thermistor 12 to switch into the high resistance state. By thermally coupling resistor RA to thermistor 12, as shown by the dashed lines in FIG. 2, the temperature of thermistor will be raised more quickly to decrease the response time. Use of heater wire for resistor RA is particularly advantageous in optimizing the response time.

Figure 3:
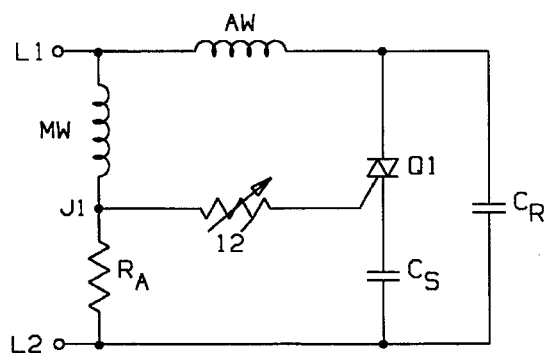
FIG. 3 is a schematic diagram similar to FIG. 1 of the invention used with a capacitor start, capacitor run induction motors
Figure 4:
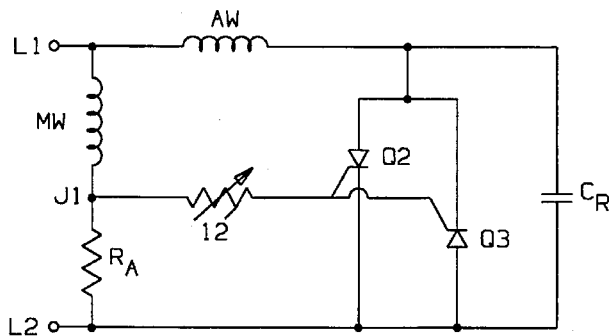
FIGS. 4 and 5 are schematic diagrams of the invention used with a capacitor run and a capacitor start, capacitor run motors respectively and in which an alternate triggerable semiconductor device is employed.
Figure 5:
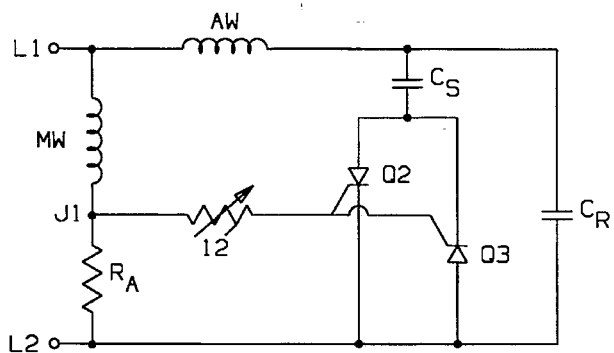

FIG. 3 shows the control circuit used with a capacitor start, capacitor run motor while FIGS. 4 and 5 show the use of back to back SCR's as the triggerable semiconductor used with capacitor run and capacitor start, capacitor run motors respectively.

Figure 6:
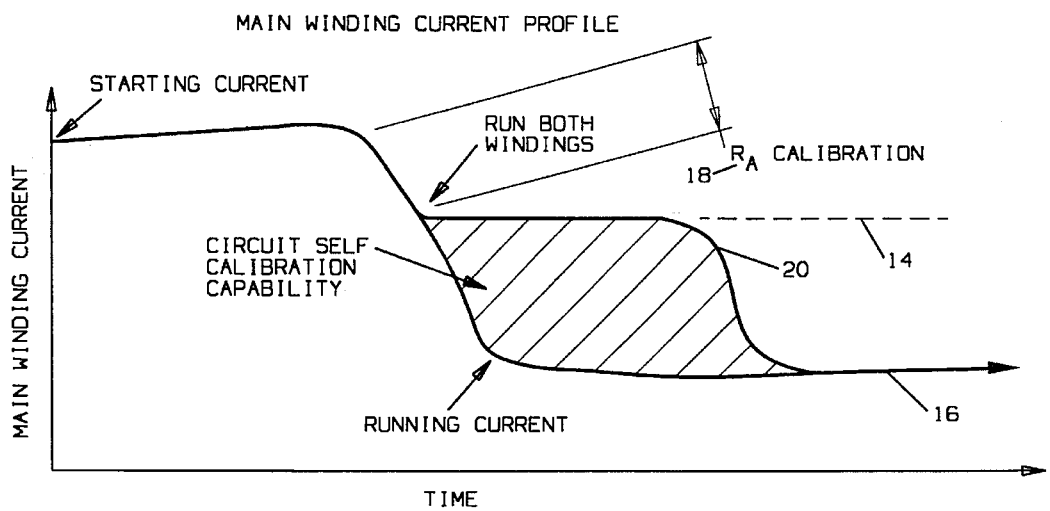
FIG. 6 is a graph of current vs time of main winding current of a typical single phase induction motor.

As stated above, one of the advantages of the present invention is that the particular value of resistor RA is not critical because the PTC thermistor 12 will turn off triac Q1 when it goes into its high resistance state. As a result, a system made in accordance with the invention can be used with a range of motors having different voltage characteristics. As seen in FIG. 6, even if the starting current of the motor winding fails to decrease to a level sufficiently low to deenergize triac Q1 such as indicated at 1 in the figure, as soon as thermistor 12 goes into the high resistance state triac Q1 will be deenergized and the running current in the main winding will decrease to 16 shown in the figure.

Without thermistor 12, a very precise resistor RA would be required for the proper voltage to be developed to form both functions of turning on and turning off the triac. Even with such a resistor a voltage fluctuation could cause a situation in which the voltage is too low to turn on the triac or, if the voltage is too high, the triac may not be turned off leaving the auxiliary winding energized at a level such as that noted at 16 of the figure.

FIG. 6 shows the high inrush of starting current decreasing, while both the main and auxiliary windings are energized, to level 14, at which the auxiliary winding is normally deenergized based on the resistance level of RA (see 18 in the graph) with the current then decreasing to normal running level at 16. In the event that the triggering current remains too high to turn off the triac the triggering current will cause thermistor 12 to heat up and go into its high resistance state thereby turning off the triac and deenergizing the auxiliary winding as indicated at 20.

Although normally a capacitor is needed to suppress dv/dt transients which could otherwise turn on the triac, the availability of so-called snubberless triacs can obviate the need for a capacitor in certain applications. In applications in which the triggerable semiconductor is subjected to substantial heat, it may be desirable to add a heat sink to the semiconductor to prevent the junction temperature from exceeding the junction temperature limit. In view of the low level of resistance required for th voltage divider resistor, it is within the purview of the invention to take advantage of interconnection voltage losses as the resistor RA in providing the desired voltage levels for gating the triac.

The invention provides a number of advantages over the prior art including decreased dependence of circuit operation on gate sensitivity of the triggerable semiconductor as well as improved protection of the triggerable semiconductor by preventing excessive voltage and current from being present at the gate of the semiconductor upon input voltage conditions higher than normal. The invention provides a system having improved longevity and reliability even when subjected to line voltage surges and less dependent upon supply voltage. The system is capable of operation at various voltages and can be calibrated so that a given system can be used for a range of motors. As stated above, the system quickly resets and can be used to cut-in the auxiliary winding upon overload conditions prior to stalling of the motor. Additionally, the system is compact and can be conveniently mounted, for example, on glass sealed pin connectors in heating, ventilating, air conditioning (HVAC) applications and refrigeration applications.

In view of the above, it will be seen that the objects of the invention are achieved and other advantageous results attained.

As various changes and modifications could be made in the above embodiments without departing from the essence of the invention, it is intended that any such changes or modifications are deemed to be within the scope of the invention as set forth in the appended claims.

What is claimed:

1. A system for controlling the operation of an induction motor having a main winding and an auxiliary winding comprising:

a triggerable semiconductor current switching device having main terminals and a gate terminal, the switching device being connectable in series with the auxiliary winding across an AC power source, conduction between the main terminals being initiated by applying a triggering current above a threshold level to the gate terminal and being terminated when the triggering current is reduced below a predetermined triggering level, resistor means having a first terminal for connection with the main winding and forming a voltage divider junction and a second terminal for connection to line voltage so that the resistor means and the main winding are connected in series across the AC power source, and a PTC thermistor having a low resistance state and a high resistance state above an anomaly point connected to the gate terminal and to the voltage divider junction, the resistance level of the low resistance state selected so that the voltage drop at the gate terminal under starting and overload conditions is sufficient to cause triggering current until the PTC thermistor goes into its high resistance state but during normal running conditions the voltage at the gate is below the predetermined triggering level and will terminate the triggering current.

2. A system for controlling the operation of an induction motor according to claim 1 in which the PTC thermistor is thermally coupled to the resistor means.

3. A system for controlling the operation of an induction motor according to claim 2 in which the resistor means comprises a selected length of heater wire.

4. A system for controlling the operation of an induction motor according to claim 1 in which the triggerable semiconductor current switching device comprises a triac.

5. A system for controlling the operation of an induction motor according to claim 1 in which the triggerable semiconductor current switching device comprises back to back SCRs.

6. A system for controlling the operation of an induction motor according to claim 1 in which the induction motor is a capacitor run motor.

7. A system for controlling the operation of an induction motor according to claim 1 in which the motor is a capacitor run, capacitor start motor.

8. A system for controlling the operation of an induction motor having a main winding and an auxiliary winding comprising:

a triggerable semiconductor current switching device having main terminals and a gate terminal, the switching device being connectable in series with the auxiliary winding across an AC power source, conduction between the main terminals being initiated by applying a triggering current above a threshold level to the gate terminal and being terminated when the triggering current is below a predetermined triggering level, resistor means for connection with the main winding and a line voltage so that the resistor means and the main winding are connected in series across the AC power source, and a PTC thermistor having a low resistance state and a supply sloped positive temperature coefficient of resistivity above an anomaly point connected to the gate terminal and to a point intermediate the resistor means and the main winding, the resistance level of the low resistance state selected so that the voltage drop at the gate terminal under starting and overload conditions is sufficient to cause triggering current until the PTC thermistor goes into a high resistance state above its anomaly point but during normal running conditions the voltage at the gate is below the predetermined triggering level and will terminate the triggering current.

\* \* \* \* \*